United States Patent [19]
Eguchi et al.

[11] Patent Number: 4,743,501
[45] Date of Patent: May 10, 1988

[54] MAGNETIC RECORDING MEDIUM

[75] Inventors: Kenichiro Eguchi; Kazuhiro Kuroda; Ryoichi Awano, all of Nagano, Japan

[73] Assignee: TDK Corporation, Tokyo, Japan

[21] Appl. No.: 935,517

[22] Filed: Nov. 26, 1986

[30] Foreign Application Priority Data

Nov. 27, 1985 [JP]  Japan ................... 60-266334
Dec. 6, 1985 [JP]   Japan ................... 60-274570
Oct. 3, 1986 [JP]   Japan ................... 61-235892

[51] Int. Cl.$^4$ .......................................... G11B 5/714
[52] U.S. Cl. ................................ 428/328; 252/62.54; 427/128; 428/329; 428/522; 428/694; 428/900
[58] Field of Search ............... 428/694, 695, 900, 522, 428/328, 329, 425.9; 427/128; 252/62.54; 360/134–136

[56] References Cited

U.S. PATENT DOCUMENTS 4,368,237  1/1983  Yamada ................... 428/900
4,529,661  7/1985  Ninomiya ................. 428/900
4,562,117  12/1985 Kikukawa ................ 428/900
4,594,174  6/1986  Nakayama ............... 428/694
4,600,521  7/1986  Nakamura ............... 428/900
4,613,545  9/1986  Chubachi ................. 428/328
4,634,633  1/1987  Ninomiya ................ 428/425.9

FOREIGN PATENT DOCUMENTS 0175024  10/1984  Japan ..................... 428/694

Primary Examiner—Ellis P. Robinson
Attorney, Agent, or Firm—Olbon, Fisher, Spivak, McClelland & Maier

[57] ABSTRACT

In a magnetic recording medium wherein a magnetic coating composition comprising a binder and a magnetic powder is applied to the surface of a substrate, the dispersion of magnetic powder in binder is improved for enhanced physical and electromagnetic properties by using a vinyl chloride/hydroxyl group-containing vinyl monomer/polar group-containing monomer copolymer or a vinyl chloride/vinyl acetate/hydroxyl group-containing vinyl monomer/polar group-containing monomer copolymer having not been subjected to saponification, the polar group-containing monomer preferably containing an epoxy group as an additional polar group. Electromagnetic properties are further improved with a metal magnetic powder having a BET value of up to 60 $m^2/g$ and a pH value of at least 7.

19 Claims, No Drawings

MAGNETIC RECORDING MEDIUM

BACKGROUND OF THE INVENTION

This invention relates to magnetic recording media, and more particularly, to magnetic recording media having improved physical properties, shelf stability, runnability, and electromagnetic properties in a high temperature, high humidity environment.

Vinyl chloride-vinyl acetate-vinyl alcohol copolymers have been widely used as the binder resin for coating type magnetic tape. Typical products of vinyl chloride-vinyl acetate-vinyl alcohol copolymer are commercially available under the trade mark "VAGH" series from UCC of the U.S. These copolymers have many advantages including solubility in various solvents, compatibility with other resins, and affinity to and hence, dispersion with magnetic powder due to their hydroxyl group. Particularly, the enhanced dispersion of magnetic powder in the copolymer ensures that the resulting magnetic coating composition exhibits good magnetic properties such as degree of orientation and maximum residual magnetic flux density as well as good electromagnetic properties.

In recent years, the magnetic powder is available in more finely divided form as will be described later. The conventional resins are not necessarily satisfactory in dispersion of such more finely divided magnetic powder. Attempts were made to promote dispersion of finely divided magnetic powder in a copolymer of this type by increasing the content of hydroxyl group in the copolymer or by copolymerizing a monomer copolymerizable with vinyl chloride, for example, maleic acid or its anhydride. Copolymers having an increased content of hydroxyl group and copolymers having copolymerized a monomer copolymerizable with vinyl chloride, however, tend to release hydrogen chloride or degrade in a similar way because they have experienced saponification for hydrolysis during their preparation process. Thus these tailored copolymers are less stable to heat so that the resulting magnetic recording media are insufficient in physical properties, an inter alia in shelf stability and runnability (or durability during repeated operation), particularly in a high temperature, high humidity environment.

Vinyl chloride-vinyl acetate-maleic acid copolymers which have not been subjected to saponification and possess a polar group-containing monomer are commercially available under the trade mark "VMCH" series from UCC of the U.S. These copolymers are inferior in dispersion and physical properties to the above-mentioned quaternary copolymers of vinyl chloride-vinyl acetate-vinyl alcohol-maleic acid having been subjected to saponification during their preparation, and thus unsuitable in dispersing the advanced micronized magnetic powder.

For the purpose of improving the magnetic properties of magnetic recording media, there is the trend of converting the magnetic powder from conventional oxide powders to metal magnetic powders for providing a higher recording density. At the same time, the magnetic powder is more micronized. Particularly in audio applications, micronizing of metal magnetic powder is essentially required to reduce noise for S/N ratio improvement. It was also found that the use of alkaline metal magnetic power affords advantageous electromagnetic properties.

Micronized metal magnetic powder is, however, difficult to uniformly disperse in a magnetic coating composition. It is thus difficult to provide the magnetic layer with a high content of magnetic powder. The micronized magnetic powder itself is more reactive than the conventional magnetic powder, and thus susceptible to a change with time in a high temperature, high humidity environment and less reliable or less stable in physical properties.

There still remains the need for further improving the dispersion and thermal stability of a coating composition of micronized magnetic powder.

SUMMARY OF THE INVENTION

It is therefore, an object of the present invention to provide a novel and improved magnetic recording medium having applied a magnetic coating composition which is improved in dispersion, thermal stability, shelf stability in a high temperature, high humidity environment, and runnability by using a vinyl chloride copolymer which has not been subjected to saponification during its preparation.

The present invention provides a magnetic recording medium comprising a substrate having a pair of opposed major surfaces and a magnetic coating composition comprising a binder and a magnetic powder applied to at least one major surface of the substrate.

According to a first aspect of the present invention, the binder is comprised of a copolymer comprising (A) vinyl chloride, (B) a hydroxyl group-containing vinyl monomer, (C) a polar group-containing monomer, and optionally (D) a vinyl acetate as component units, wherein the hydroxyl group of said hydroxyl group-containing vinyl monomer (B) is not directly attached to the vinyl group, and the polar group-containing monomer (C) contains at least one polar group selected from residues and salts of carboxylic acid, phosphoric acid, sulfuric acid, and sulfonic acid, and an amino group and an ammonium group.

According to a second aspect of the present invention, the polar group-containing monomer (C) contains an epoxy group in addition to the polar group.

In a preferred embodiment of the present invention, the magnetic powder is a metal magnetic powder having a BET value of up to 60 m$^2$/g and a pH value of at least 7.

DETAILED DESCRIPTION OF THE INVENTION

The present invention provides an improvement in a coating type magnetic recording medium comprising a substrate and a magnetic layer formed on the substrate by applying a magnetic coating composition of a binder and a magnetic powder. The general structure of such media is well known in the art.

The binders used in the present invention include copolymers comprising (A) vinyl chloride, (B) a hydroxyl group-containing vinyl monomer, and (C) a polar group-containing monomer as component units, and copolymers comprising (A) vinyl chloride, (B) a hydroxyl group-containing vinyl monomer, (C) a polar group-containing monomer, and (D) a vinyl acetate as component units. These copolymers are free of vinyl alcohol, that is, have not been subjected to saponification during their preparation.

The polar group-containing monomers as unit (C) are vinyl monomers having a polar group. The polar groups include residues and salts of carboxylic acid, phosphoric acid, sulfuric acid, and sulfonic acid, and an amino group and an ammonium group. The residues of carboxylic acid, phosphoric acid, sulfuric acid, and sulfonic acid are COOH, PO$_4$H$_2$, SO$_4$H, and SO$_3$H, respectively, and their salts include salts with alkali metals such as K and Na and alkaline earth metals such as Ca and Mg, and ammonium salts. The phosphate residues may be monophosphoric acid esters having an alkyl or aryl group.

The amino groups may be either unsubstituted one or mono-substituted amino groups having an alkyl or aryl group.

The ammonium groups may be either unsubstituted one or mono-, di-, and tri-substituted ammonium groups having an alkyl or aryl group. The ammonium groups may have attached thereto an acid anion such as a halogen anion.

The polar group-containing monomers used herein contain at least one polar group selected from the above-mentioned polar groups. The polar group may be attached either directly to the vinyl group or to a substituent group attached to the vinyl group. The substituent group which intervenes between the polar group and the vinyl group is preferably ROCO—, R—, RNHCO—, RSi—, and RNCOOCO— wherein R is an alkyl radical, preferably having 1 to 10 carbon atoms, or an aryl radical such as phenyl and naphthyl. The alkyl and aryl radicals represented by R may be substituted ones.

In general, only one polar group is directly or indirectly attached to the vinyl group although two or more polar groups may be attached.

The vinyl group to which the polar group is attached may have attached thereto an additional group, for example, an alkyl group, preferably having 1 to 10 carbon atoms, and an aryl group, with the lower alkyl groups being preferred.

Some illustrative, non-limiting examples of the polar group-containing monomers are given below.

(1) Carboxylate Group-Containing Monomers (1) acrylic acid
(2) metharylic acid
(3) crotonic acid
(4) isocrotonic acid
(5) vinylacetic acid
(6) angelic acid
(7) tiglic acid
(8) allylacetic acid
(9) β, β-dimethylacrylic acid
(10) pyroterebic acid
(11) undecylenic acid
(12) maleic acid
(13) itaconic acid (2) Phosphate Group-Containing Monomers (1) CH$_2$=CHCOO(R)$_n$—OPO(OH)$_2$
wherein R is selected from substituted or unsubstituted methylene radicals such as CH$_2$ and C(CH$_3$)$_2$, and n is from 1 to about 10.

(2) CH$_2$=CHCOO[C(CH$_3$)$_2$]$_n$(CH$_2$)$_m$—OPO(OH)$_2$
wherein m is from 1 to about 10, and n is from 1 to about 10.

(3) Sulfate Group-Containing Monomers

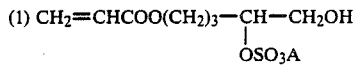

wherein A is a cation such as H, Na and K.

(4) Sulfonate Group-Containing Monomers (1) vinylsulfonic acid
(2) vinylsulfonic acid salts
(3) styrenesulfonic acid
(4) styrenesulfonic acid salts
(5) CH$_2$=CH(R)$_n$SO$_3$A
wherein R is selected from substituted or unsubstituted methylene radicals such as CH$_2$ and C(CH$_3$)$_2$, n is from 1 to about 10, and A is a cation such as H, Na, and K.
(6) CH$_2$=CH[C(CH$_3$)$_2$]$_n$(CH$_2$)$_m$SO$_3$A
wherein m is from 1 to about 10, n is from 1 to about 10, and A is a cation such as H, Na, and K.

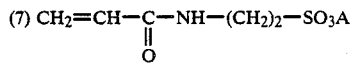

wherein A is a cation such as H, Na, and K.

(5) Amino Group-Containing Monomers (1) acrylamide
(2) CH$_2$=CHCOO(CH$_2$)$_2$—NH$_2$
(3) dimethylaminoethyl methacrylate
(4) CH$_2$=CHCONH(CH$_2$)$_2$—SO$_3$A
wherein A is a cation such as H, Na, and K.

(6) Ammonium Group-Containing Monomers (1) CH$_2$=CHCOO(CH$_2$)$_3$—N—(R')$_3$$^+$X$^-$
wherein R' is an alkyl such as CH$_3$ and C$_2$H$_5$, and X is an anion such as Cl and I.
(2) diallyldimethylammonium bromide At least one of the polar group-containing monomers as illustrated above is contained in the copolymer according to the present invention in a total amount of 0.02 to 40% by weight based on the copolymer. Consequently, the polar group is contained in the copolymer in a total amount of 0.01 to 15% by weight, preferably 0.01 to 5% by weight based on the copolymer. Copolymers containing less than 0.01% by weight of the polar group have poor dispersibility whereas copolymers containing more than 15% by weight of the polar group are insufficient with respect to solubility and durability.

The polar group-containing monomers used herein may contain an additional polar group, that is, an epoxy group in addition to at least one polar group selected from the class consisting of residues and salts of carboxylic acid, phosphoric acid, sulfuric acid, and sulfonic acid, and an amino group and an ammonium group (to be referred to as first polar group for the purpose of distinction). These monomers are sometimes referred to as epoxy group-containing monomers. Since the polar group-containing monomers are prepared by introducing the first polar group via an epoxy group, these epoxy group-containing monomers may be obtained by modifying the process so as to leave the epoxy group. The epoxy group

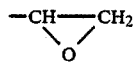

contained therein is generally unsubstituted one.

The first polar group and the epoxy group may be attached either directly to the vinyl group or to a substituent group attached to the vinyl group. The substituent group which intervenes between the first polar group or epoxy group and the vinyl group is selected from the same groups as previously described in conjunction with the polar group, preferably ROCO— wherein R is an alkyl radical, preferably having 1 to 10 carbon atoms, or an aryl radical such as phenyl and naphthyl. The alkyl and aryl radicals represented by R may be substituted ones.

In general, only one epoxy group and only one first polar group are directly or indirectly attached to the vinyl group although two or more first polar or epoxy groups may be attached.

The vinyl group to which the epoxy and first polar groups are attached may have attached thereto an additional group, for example, an alkyl group, preferably having 1 to 10 carbon atoms, and an aryl group, with the lower alkyl groups being preferred.

Some illustrative, non-limiting examples of the epoxy group-containing monomers are given below.

(7) Epoxy group-containing monomers

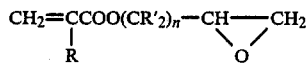

wherein R and R' are independently H, $CH_3$, and analogues and n is from 1 to about 10. Glycidyl methacrylate is a typical example.

At least one of the epoxy group-containing monomers as illustrated above is contained in the copolymer according to the present invention in a total amount of 0.02 to 40% by weight based on the copolymer. Consequently, the epoxy and first polar groups are contained in the copolymer in a total amount of 0.01 to 15% by weight. Preferably the epoxy group occupies 50 to 95% by weight of the combined weight of the epoxy and first polar groups. Epoxy contents in excess of 95% by weight of the combined polar groups result in poor dispersibility whereas epoxy contents of less than 50% by weight of the combined polar groups are insufficient for the epoxy group to exert its thermal stabilization effect.

The inclusion of an epoxy group as an additional polar group imparts additional heat resistance to the copolymer.

The copolymers containing (C) the polar group-containing monomer as an essential component further contain (A) vinyl chloride and (B) a hydroxyl group-containing vinyl monomer as essential components.

The copolymers used herein comprises 60 to 95% by weight, preferably 70 to 90% by weight of vinyl chloride unit (A). Copolymers having vinyl chloride contents in excess of 95% are less soluble whereas copolymers having less than 60% of vinyl chloride are less dispersible.

The hydroxyl group-containing vinyl monomers (B) used herein are vinyl monomers having a hydroxyl group attached to the vinyl group via a linkage group, but not directly. More illustratively, the linkage group which intervenes between the hydroxyl group and the vinyl group is preferably ROCO— and R— wherein R is an alkyl radical, preferably having 2 to 10 carbon atoms, or an aryl radical such as phenyl and naphthyl. Most preferably, R is an alkyl radical having 2 to 5 carbon atoms. The alkyl and aryl radicals represented by R may be substituted ones.

The hydroxyl group is preferably attached to the carbon atom contained in R on the terminal side, rather than adjacent to the ester group in the case of ROCO—.

In general, only one linkage group is attached to the vinyl group although two or more linkage groups may be attached.

The vinyl group to which the linkage group is attached may have attached thereto an additional group, for example, an alkyl group, preferably having 2 to 10 carbon atoms, and an aryl group, with the lower alkyl groups being preferred.

Preferred among the hydroxyl group-containing monomers are hydroxyalkyl acrylates and methacrylates. Some illustrative, non-limiting examples of the hydroxyl group-containing monomers are given below.

(1) 2-hydroxyethyl acrylate
(2) 2-hydroxyethyl methacrylate
(3) 2-hydroxypropyl acrylate
(4) 2-hydroxypropyl methacrylate
(5) 3-hydroxypropyl acrylate
(6) 3-hydroxypropyl methacrylate
(7) 2-hydroxybutyl acrylate
(8) 2-hydroxybutyl methacrylate
(9) 3-hydroxybutyl acrylate
(10) 3-hydroxybutyl methacrylate
(11) 4-hydroxybutyl acrylate
(12) 4-hydroxybutyl methacrylate
(13) 5-hydroxypentyl acrylate
(14) 5-hydroxypentyl methacrylate
(15) 6-hydroxyhexyl acrylate
(16) 6-hydroxyhexyl methacrylate
(17) neopentyl glycol acrylate
(18) neopentyl glycol methacrylate
(19) allyl carbinol
(20) allyl alcohol
(21) crotyl alcohol
(22) citronellol
(23) phytol
(24) cinnamyl alcohol At least one of the hydroxyl group-containing monomers as illustrated above is contained in the copolymer according to the present invention in a total amount of 0.02 to 40% by weight based on the copolymer. Consequently, the hydroxyl group is contained in the copolymer in a total amount of 0.01 to 5% by weight based on the copolymer. Copolymers containing less than 0.01% by weight of the hydroxyl group are less dispersible and less cross-linkable with a crosslinking agent as will be described later whereas copolymers containing more than 5% by weight of the hydroxyl group are insufficient with respect to solubility and durability.

The copolymers used herein may further comprises (D) vinyl acetate as a fourth component. The addition of vinyl acetate improves solubility. The content of vinyl acetate in the copolymer is limited to 20% by weight because copolymers containing more than 20% by weight of vinyl acetate are less dispersible.

The copolymers generally have a number average molecular weight in the range from 10,000 to 30,000. Physical properties are less desirable with a number average molecular weight of less than 10,000 whereas copolymers having a number average molecular weight of more than 30,000 are less dispersibble.

These copolymers may generally be synthesized by copolymerizing the monomers by a conventional process. Alternatively, an acid or ammonium group may be separately introduced into a previously synthesized copolymer by a conventional technique. It is also possible to modify a copolymer having an epoxy group-containing monomer involved.

The copolymers as illustrated above are used as a main binder in the magnetic recording medium.

The binder which is used in the practice of the present invention may further comprise a thermoplastic elastomer and/or a thermoplastic resin, the content thereof ranging up to 70% by weight, preferably 20 to 70% by weight of the resinous value of the binder.

Some preferred, non-limiting examples of the thermoplastic elastomers are given below.

(i) Polyurethane Elastomers

Urethane based elastomers are preferred examples of the thermoplastic elastomers useful for the purpose of the present invention in that they possess a well balanced combination of properties including the abrasion resistance of a magnetic coating, adherence to a PET substrate, and wettability of magnetic particulates.

Illustrative polyurethane elastomers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L and Desmodur N (trade marks, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like.

(ii) Acrylonitrile-butadiene Copolymerized Elastomers

Acrylonitrile-butadiene copolymers having a hydroxyl terminal group commercially available as Poly BD Liquid Resin from Sinclair Petro-Chemical and elastomers commercially available as Hiker 1432J from Nihon Zeon K.K. are adequate.

(iii) Polybutadiene Elastomer

Low molecular weight prepolymers having a hydroxyl terminal group commercially available as Poly BD Liquid Resin R-15 from Sinclair Petro-Chemical and the like are preferred because they are compatible with thermoplastic resins and have affinity to magnetic powder.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers include chlorinated rubbers, acrylic rubbers, isoprene rubbers, and cyclic products thereof (commercially available as CIR 701 from Nihon Synthetic Rubber K.K.), epoxy-modified rubbers, and internally plasticized, saturated linear polyesters (commercially available as Vyron #300 from Toyobo K.K.).

The thermoplastic resin may be used in lieu of or in addition to the thermoplastic elastomer. Examples of the thermoplastic resins include linear saturated polyester resins, low molecular weight polyester resins having versatile applications in two-part form with isocyanate and commercially availabale as Desmophen #800, #1100, and #2200 from Farbenfabriken Bayer A.G., epoxy resins, phenoxy resins, chlorosulfonated polyethylene, vinyl isobutyl ether, polyamide resins, polyvinylbutyral resins, and polyvinylpyrrolidone resins.

The binders may be cross-linked with a cross-linking agent which is reactive with the hydroxyl group of the copolymers, if desired. Such cross-linking agents may be polyfunctional isocyanate compounds having an isocyanate group as previously set forth and isocyanate-containing compounds, and butyrated melamine resins.

The binders may generally be cured by heating them in a heating oven at a temperature of 50° to 80° C. for 6 to 100 hours.

The magnetic coating compositions applied to the magnetic recording media of the present invention comprise magnetic powders which in a broader aspect, include metal magnetic particles, cobalt-coated iron oxide particles, gamma-$Fe_2O_3$ particles, and barrium ferrite particles, but are not limited thereto.

In one preferred embodiment of the present invention, the magnetic powder is a metal magnetic powder having a specific surface area of up to 60 $m^2/g$ expressed in BET value and a pH value of at least 7, more preferably a BET value of 30 to 60 $m^2/g$ and a pH value of 7 to 10.

The specific surface area of magnetic powder can be measured using an automatic specific surface area meter (Micromeritics Model 2200-01 manufactured by Shimazu Mfg. K.K.) based on the one point adsorption method for BET method.

Powders having a BET value in excess of 60 $m^2/g$ are relatively unfavorable with respect to dispersion, electromagnetic properties, and transfer, whereas powders having a BET value of less than 30 $m^2/g$ result in a somewhat low S/N ratio. For this reason, the BET value of the preferred magnetic powder ranges from 30 to 60 $m^2/g$ The pH of the magnetic powder may be measured according to JIS K5101. More specifically, 5 grams of magnetic powder is admitted into a beaker along with 100 ml of distilled water. The contents are heated until boiling and then cooled, allowing the magnetic powder to precipitate. The supernatant is measured for pH by a pH meter (for example, HORIBA F-7).

When the pH of magnetic powder is lower than 7, the resulting magnetic recording medium has somewhat reduced electromagnetic properties appearing as a reduction of output and sensitivity in the low frequency range in audio application, for example. The coating composition becomes less durable with a magnetic powder having a pH value in excess of 10.

The composition of the metal magnetic powder used herein includes elemental Fe, Co and Ni, alloys thereof, and mixtures of elemental Fe, Co or Ni or alloys thereof and at least one element selected from Cr, Mn, Co, and Ni. The mixtures may further contain Zn, Cu, Zr, Al, Ti, Bi, Ag, or Pt along or in admixture. The metals and alloys mentioned above having a minor amount of a non-metallic element such as B, C, Si, P and N added may also be used without losing the benefit of the present invention.

These metal magnetic powders may be controlled to the above-defined ranges of specific surface area and pH by properly selecting their composition and preparation method. It is also possible to subject the metal magnetic powder to an alkali treatment using an amine or ammonia.

The metal magnetic powder may be used in either needle or particulate form depending on the intended application of the magnetic recording medium.

The mixing ratio of magnetic powder to binder ranges from 10:1 to 1:10 on a weight basis.

The magnetic coating compositions may further contain any desired additives including abrasives, lubricants, antistatic agents, and dispersants for their known purposes.

The magnetic or recording layer is generally formed by applying the magnetic coating composition onto the substrate to a final thickness of about 1 to 7 $\mu$m.

The substrate may be chosen from various resins such as polyesters, polyamides, and polyimides, metals such as aluminum, and inorganic materials such as glass and ceramics in any desired form including films and disks, depending on the intended application.

The surface of the substrate opposed to the recording layer-bearing surface may be provided with any of well-known backcoat layers. Alternatively, the substrate may be provided with a recording layer on either major surface.

Since the magnetic coating composition according to the present invention uses a binder in the form of a copolymer comprising (A) vinyl chloride, (B) a hydroxyl group-containing vinyl monomer, (C) a polar group-containing monomer, and optionally (D) a vinyl acetate as component units and having not been subjected to saponification, a great affinity appears between the binder and the micronized magnetic powder, resulting in magnetic recording media having improved reliability, durability, and electromagnetic properties.

Since the binder used is a copolymer comprising vinyl chloride and monomers copolymerizable therewith as component units and free of vinyl alcohol, that is, having not been subjected to saponification, the resulting coating composition experiences only a minimized change with time in a high temperature, high humidity environment and thus improves the runnability of the associated magnetic tape without detracting from electromagnetic properties. The use of a copolymer having not been subjected to saponification during its preparation not only avoids release of hydrogen chloride and hence, chemical change of the resin itself due to hydrogen chloride release, but also minimizes the chemical change of the magnetic powder and other medium components by the action of released hydrogen chloride, thereby improving the overall physical properties of magnetic recording medium, particularly the shelf stability and runnability thereof in a high temperature, high humidity environment.

The use of a copolymer having a polar group-containing monomer as an essential component provides enhanced dispersion of magnetic powder in the magnetic coating composition. The inclusion of an epoxy group as one of polar groups imparts enhanced heat resistance to the recording layer.

Metal magnetic powders having a specific surface area of up to 60 $m^2$/g have good affinity to the binder as defined herein so that the resulting magnetic layer exhibits improved runnability and excellent electromagnetic properties as demonstrated by a high S/N ratio.

Metal magnetic powders of pH 7 or higher are effective in providing the magnetic coating layer with improved electromagnetic properties, especially frequency response.

EXAMPLES

Examples of the present invention are presented below by way of illustration and not by way of limitation.

EXAMPLE 1

There were prepared three types of magnetic powder:
$\gamma$-$Fe_2O_3$ powder,
Co-$\gamma$-$Fe_2O_3$ powder, and
metal (pure ion) powder.

There were prepared a series of copolymers as shown in Table 1. It is understood that Copolymers I to VII fall within the scope of the present invention and Copolymers VIII to X are outside the scope of the invention.

TABLE 1

| | | Monomers, % by weight | | | | Polar group-containing monomer | |
| --- | --- | --- | --- | --- | --- | --- | --- |
| Copolymer | Degree of polymerization | Vinyl chloride | OH—contg. monomer | Vinyl acetate | Vinyl alcohol | Type | content (wt %) |
| I | 400 | 85 | 13 (2-HEMA)* | 0 | 0 | maleic acid | 2 |
| II | 300 | 80 | 13 (2-HEMA) | 5 | 0 | sodium maleate | 2 |
| III | 200 | 85 | 1 (2-HEMA) | 0 | 0 | $\begin{cases} CH_2=CHCOO(CH_2)_3-\overset{OSO_3k}{\underset{\|}{CH}}-CH_2OH \\ CH_2=CHCOO(CH_2)_3-CH\underset{\diagdown O \diagup}{\text{———}}CH_2 \end{cases}$ | 2<br>12 |
| IV | 300 | 85 | 13 (2-HEMA) | 0 | 0 | $CH_2=CH(CH_2)_2-SO_3Na$ | 2 |
| V | 400 | 83 | 3 (allylcarbinol) | 0 | 0 | $\begin{cases} \text{maleic acid} \\ CH_2=CHCOO(CH_2)_3-CH\underset{\diagdown O \diagup}{\text{———}}CH_2 \end{cases}$ | 2<br>12 |

TABLE 1-continued

| Copolymer | Degree of polymerization | Monomers, % by weight | | | | Polar group-containing monomer | |
|---|---|---|---|---|---|---|---|
| | | Vinyl chloride | OH—contg. monomer | Vinyl acetate | Vinyl alcohol | Type | content (wt %) |
| VI | 400 | 80 | 13 (2-HEMA) | 5 | 0 | $CH_2=CHCOO(CH_2)_3-NH_2$ | 2 |
| VII | 400 | 83 | 3 (2-HEMA) | 0 | 0 | $CH_2=CHCOO(CH_2)_3-N(CH_3)^+Cl^-$ | 2 |
| | | | | | | maleic acid | 2 |
| | | | | | | | 10 |
| | | | | | | $CH_2=CHCOO(CH_2)_3-CH\underset{O}{\overset{}{-\!\!\!-}}CH_2$ | |
| VIII | 450 | 91 | 0 | 3 | 6 | — | — |
| IX | 400 | 90 | 0 | 3 | 5 | maleic acid | 2 |
| X | 400 | 85 | 12 (2-HEMA) | 3 | 0 | — | — |

*2-HEMA: 2-hydroxyethyl methacrylate

Using one of the magnetic powders and one of the copolymers in a combination as shown in Table 2, a series of magnetic coating compositions were prepared as follows.

| Ingredients | Parts by weight |
|---|---|
| Magnetic powder | 100 |
| Copolymer | 10 |
| Polyurethane resin* | 10 |
| Lubricant | 1 |
| Abrasive | 1 |
| Methyl ethyl ketone | 70 |
| Methyl isobutyl ketone | 70 |
| Toluene | 70 |

*Nippolane 2304 available from Nihon Polyurethane K.K.

The mixture was dispersed in a ball mill for about 20 hours, and a cross-linking agent, Colonate L (polyisocyanate commercially available from Nihon Polyurethane K.K.) was then added. The resulting composition was coated onto a polyester base film of 8 μm thick. The coated film was surface processed and thermoset, yielding a magnetic tape having a coating layer of 5 μm.

Prior to the surface processing, the coating compositions were measured for gloss by means of a gloss meter of Murakami type. The results are also shown in Table 2. As evident from the data in Table 2, the coatings of Examples have a markedly higher gloss than those of Comparative Examples, indicating enhanced dispersion.

The tapes were continuously operated for 24 and 48 hours in an environment at 50° C. and RH 80%. Failure rates during operation expressed in percent are shown in Table 2. The failure rate in the 50° C., RH 80% environment is 20% at the maximum in the present samples, but reaches 55% at the minimum in the comparative samples.

TABLE 2

| Sample | Magnetic powder | Copolymer | Gloss (%) | Failure rate @ 50° C., RH 80%, 48 hr. |
|---|---|---|---|---|
| 1 | $\gamma$-$Fe_2O_3$ | I | 100 | 0–20 |
| 2 | Co—$\gamma$-$Fe_2O_3$ | I | 110 | 0–20 |
| 3 | metal | I | 70 | 0–20 |
| 4 | $\gamma$-$Fe_2O_3$ | II | 100 | 0–20 |
| 5 | Co—$\gamma$-$Fe_2O_3$ | II | 110 | 0–20 |
| 6 | metal | III | 80 | 0–5 |
| 7 | $\gamma$-$Fe_2O_3$ | III | 110 | 0–5 |
| 8 | Co—$\gamma$-$Fe_2O_3$ | IV | 110 | 0–20 |
| 9 | metal | IV | 70 | 0–20 |
| 10 | $\gamma$-$Fe_2O_3$ | V | 100 | 0–5 |
| 11 | Co—$\gamma$-$Fe_2O_3$ | V | 110 | 0–5 |
| 12 | metal | VI | 70 | 0–20 |
| 13 | $\gamma$-$Fe_2O_3$ | VII | 100 | 0–5 |
| 14 | Co—$\gamma$-$Fe_2O_3$ | VII | 115 | 0–5 |
| 15 | metal | VII | 80 | 0–5 |
| 16* | $\gamma$-$Fe_2O_3$ | VIII | 45 | 80 |
| 17* | Co—$\gamma$-$Fe_2O_3$ | VIII | 50 | 60 |
| 18* | metal | VIII | 30 | 60 |
| 19* | $\gamma$-$Fe_2O_3$ | IX | 65 | 55 |
| 20* | Co—$\gamma$-$Fe_2O_3$ | IX | 70 | 80 |
| 21* | metal | IX | 40 | 100 |
| 22* | $\gamma$-$Fe_2O_3$ | X | 55 | 100 |
| 23* | Co—$\gamma$-$Fe_2O_3$ | X | 60 | 100 |
| 24* | metal | X | 40 | 100 |

*outside the scope of the invention

All the tape samples were satisfactory with respect to electromagnetic performance. It is evident that the magnetic recording media of the present invention have improved physical properties as well as satsifactory electromagnetic properties.

EXAMPLE 2

There were prepared a series of metal (pure ion) magnetic powders having varying specific surface area (BET) and pH as shown in Table 3.

TABLE 3

| Metal powder | Specific surface area ($m^2/g$) | pH |
|---|---|---|
| A | 40 | 5 |
| B | 40 | 6 |
| C | 40 | 7 |
| D | 40 | 8 |
| E | 40 | 9 |
| F | 40 | 10 |
| G | 40 | 11 |
| H | 25 | 8 |
| I | 30 | 8 |
| J | 50 | 8 |
| K | 60 | 8 |
| L | 65 | 8 |

The specific surface area of magnetic powder was measured using an automatic specific surface area meter, Micromeritics Model 2200-01 manufactured by Shimazu Mfg. K.K. based on the one point adsorption method for BET method.

The pH of magnetic powder was measured according to JIS K5101 by admitting 5 grams of magnetic powder into a beaker along with 100 ml of distilled water, heating the contents until boiling, cooling, and then measuring the pH of the supernatant using a HORIBA F-7 pH meter.

There were prepared a series of copolymers I to X which were the same as reported in Table 1 except that 3% by weight of allylcarbinol was replaced by 3% by weight of 2-hydroxyethyl methacrylate for Copolymer V.

Using one of the metal magnetic powders and one of the polymers in a combination as shown in Table 4, a series of magnetic coating compositions were prepared as follows.

| Ingredients | Parts by weight |
| --- | --- |
| Metal magnetic powder | 100 |
| Copolymer | 10 |
| Polyurethane resin (Nippolane 2304 ®) | 10 |
| Lubricant | 1 |
| Abrasive | 1 |
| Methyl ethyl ketone | 70 |
| Methyl isobutyl ketone | 70 |
| Toluene | 70 |

The mixture was dispersed in a ball mill for about 20 hours, and a cross-linking agent, Colonate L (polyisocyanate commercially available from Nihon Polyurethane K.K.) was then added. The resulting composition was coated onto a polyester base film of 8 μm thick. The coated film was surface processed and thermoset, yielding a magnetic tape having a coating layer of 5 μm.

The coating compositions were measured for gloss by means of a gloss meter of Murakami type. The results are shown in Table 4.

The resulting magnetic tapes were measured for the following properties.

Failure Rate (Thermal Stability)

The failure rate in percentage was determined by continuously operating a tape sample for 24 and 48 hours in an environment at 50° C. and RH 80%.

Electromagnetic Properties

The maximum output level (MOL333) in dB and the sensitivity (S333) in dB were measured both at a frequency of 333 Hz. It should be noted that measurements are expressed as relative values using measurements of sample No. 103 (metal magnetic powder C/copolymer I) as the standard (zero). The results are shown in Table 4.

It was found that magnetic tapes associated with metal magnetic powder H had a high sensitivity, but a low S/N ratio, and were thus relatively less favorable among the present samples.

TABLE 4

| Sample No. | Metal magnetic powder Type | BET (m²/g) | pH | Copolymer | Gloss (%) | Failure rate (%) | MOL 333 (dB) | S 333 (dB) |
| --- | --- | --- | --- | --- | --- | --- | --- | --- |
| 101* | A | 40 | 5 | I | 70 | 0-20 | -1.0 | -1.0 |
| 102* | B | 40 | 6 | I | 70 | 0-20 | -1.0 | -0.5 |
| 103 | C | 40 | 7 | I | 70 | 0-20 | 0 | 0 |
| 104 | D | 40 | 8 | I | 70 | 0-20 | +0.5 | +0.5 |
| 105 | E | 40 | 9 | I | 70 | 0-20 | +0.5 | +0.5 |
| 106 | F | 40 | 10 | I | 70 | 0-20 | +1.0 | +0.5 |
| 107* | G | 40 | 11 | I | 70 | 50 | +1.0 | +0.5 |
| 108* | H | 25 | 8 | I | 90 | 0-20 | +2.0 | +1.5 |
| 109 | I | 30 | 8 | I | 80 | 0-20 | +1.0 | +1.0 |
| 110 | J | 50 | 8 | I | 70 | 0-20 | ±0 | ±0 |
| 111 | K | 60 | 8 | I | 70 | 0-20 | ±0 | ±0 |
| 112* | L | 65 | 8 | I | 60 | 0-20 | -1.0 | -1.0 |
| 113 | D | 40 | 8 | II | 70 | 0-20 | +0.5 | +0.5 |
| 114 | D | 40 | 8 | III | 80 | 0-5 | +0.5 | +0.5 |
| 115 | D | 40 | 8 | IV | 70 | 0-20 | °0.5 | +0.5 |
| 116 | D | 40 | 8 | V | 70 | 0-5 | +0.5 | +0.5 |
| 117 | D | 40 | 8 | VI | 70 | 0-20 | +0.5 | +0.5 |
| 118 | D | 40 | 8 | VII | 70 | 0-5 | +0.5 | +0.5 |
| 119* | D | 40 | 8 | VIII | 30 | 60 | -1.0 | -1.0 |
| 120* | D | 40 | 8 | IX | 40 | 100 | -1.0 | -1.0 |
| 121* | D | 40 | 8 | X | 40 | 100 | -1.0 | -1.0 |
| 122* | A | 40 | 5 | VIII | 30 | 100 | -1.5 | -1.5 |
| 123* | B | 40 | 6 | VIII | 30 | 100 | -1.0 | -1.0 |
| 124* | H | 25 | 8 | VIII | 30 | 50 | +2.0 | +1.5 |
| 125* | L | 65 | 8 | VIII | 20 | 100 | -2.0 | -2.0 |
| 126* | A | 40 | 5 | III | 70 | 0-5 | -1.0 | -0.5 |
| 127* | B | 40 | 6 | III | 70 | 0-5 | -1.0 | -0.5 |
| 128 | C | 40 | 7 | III | 70 | 0-5 | 0 | 0 |
| 129 | E | 40 | 9 | III | 70 | 0-5 | +0.5 | +0.5 |
| 130 | F | 40 | 10 | III | 70 | 0-5 | +0.5 | +0.5 |
| 131* | G | 40 | 11 | III | 70 | 50 | +0.5 | +0.5 |
| 132* | H | 25 | 8 | III | 70 | 0-5 | +2.0 | +1.5 |
| 133 | I | 30 | 8 | III | 70 | 0-5 | +1.0 | +1.0 |
| 134 | J | 50 | 8 | III | 70 | 0-5 | ±0 | ±0 |
| 135 | K | 60 | 8 | III | 70 | 0-5 | ±0 | ±0 |
| 136* | L | 65 | 8 | III | 70 | 0-5 | -1.0 | -1.0 |

*comparison

We claim:

1. In a magnetic recording medium comprising a substrate having a pair of opposed major surfaces and a magnetic recording composition comprising a binder and a magnetic powder having a BET value of 30 to 60 m²/g and a pH value of 7 to 10 applied to at least one major surface of said substrate, the improvement wherein said binder is comprised of a copolymer comprising (A) vinyl chloride, (B) a hydroxyl group-containing vinyl monomer, (C) a polar group-containing monomer, and optionally (D) a vinyl acetate as component units, wherein the hydroxyl group of said hydroxy group-containing vinyl monomer (B) is not directly attached to the vinyl group, and the polar group-containing monomer (C) contains 0.01 to 15% by weight of at least one polar group selected from residues and salts of carboxylic acid, phosphoric acid, sulfuric acid, and sulfonic acid, and an amino group and an ammonium group.

2. The magnetic recording medium of claim 1, wherein said binder is a thermosetting binder.

3. The magnetic recording medium of claim 1 wherein said copolymer comprises 60 to 95% by weight of the vinyl chloride unit.

4. The magnetic recording medium of claim 1 wherein said copolymer comprises up to 20% by weight of the vinyl acetate unit.

5. The magnetic recording medium of claim 1 wherein said copolymer contains 0.01 to 5% by weight of the hydroxyl group.

6. The magnetic recording medium of claim 1 wherein said copolymer has a number average molecular weight of 10,000 to 30,000.

7. The magnetic recording medium of claim 1 wherein said binder further comprises up to 70% by weight of at least one member selected from a thermoplastic elastomer and a thermoplastic resin.

8. The magnetic recording medium of claim 1 wherein said copolymer is cross-linked with a cross-linking agent.

9. The magnetic recording medium of claim 10, wherein said binder is a thermosetting binder.

10. In a magnetic recording medium comprising a substrate having a pair of opposed major surfaces and a magnetic coating composition comprising a binder and a magnetic powder having a BET value of 30 to 60 $m^2/g$ and a pH value of 7 to 10 applied to at least one major surface of said substrate, the improvement wherein said binder is comprised of a copolymer comprising (A) vinyl chloride, (B) a hydroxyl group-containing vinyl monomer, (C) a polar group-containing monomer, and optionally (D) a vinyl acetate as component units, wherein the hydroxyl group of said hydroxy group-containing vinyl monomer (B) is not directly attached to the vinyl group, and the polar group-containing monomer (C) contains 0.01 to 15% by weight of at least one polar group selected from residues and salts of carboxylic acid, phosphoric acid, sulfuric acid, and sulfonic acid, and an amino group and an ammonium group and also contains an epoxy group.

11. The magnetic recording medium of claim 10 wherein the epoxy group occupies 50 to 95% by weight of the polar groups contained in said copolymer.

12. The magnetic recording medium of claim 10 wherein said copolymer comprises 60 to 95% by weight of the vinyl chloride unit.

13. The magnetic recording medium of claim 10 wherein said copolymer comprises up to 20% by weight of the vinyl acetate unit.

14. The magnetic recording medium of claim 10 wherein said copolymer contains 0.01 to 5% by weight of the hydroxyl group.

15. The magnetic recording medium of claim 10 wherein said copolymer has a number average molecular weight of 10,000 to 30,000.

16. The magnetic recording medium of claim 10 wherein said binder further comprises up to 70% by weight of at least one member selected from a thermoplastic elastomer and a thermoplastic resin.

17. The magnetic recording medium of claim 10 wherein said copolymer is cross-linked with a cross-linking agent.

18. The magnetic recording medium of claim 1, wherein said polar group is selected from residues and salts of phosphoric acid, sulfuric acid and sulfonic acid, and an amino group and an ammonium group.

19. The magnetic recording medium of claim 10, wherein said polar group is selected from residues and salts of phospshoric acid, sulfuric acid and sulfonic acid, and an amino group and an ammonium group.

* * * * *